(12) United States Patent
Blair et al.

(10) Patent No.: US 11,571,953 B2
(45) Date of Patent: Feb. 7, 2023

(54) END CAP ASSEMBLY

(71) Applicant: AISIN TECHNICAL CENTER OF AMERICA, INC., Northville, MI (US)

(72) Inventors: Lindsey Blair, Brighton, MI (US); Joel Runyan, Canton, MI (US); Takayuki Umeki, Novi, MI (US); Scott Cullen, Milford, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 141 days.

(21) Appl. No.: 17/218,999

(22) Filed: Mar. 31, 2021

(65) Prior Publication Data
US 2022/0314759 A1  Oct. 6, 2022

(51) Int. Cl.
*B60J 7/00* (2006.01)
*B60J 1/20* (2006.01)

(52) U.S. Cl.
CPC ........... *B60J 7/0007* (2013.01); *B60J 1/2011* (2013.01)

(58) Field of Classification Search
CPC ........ B60J 7/0007; B60J 7/0084; B60J 7/043; B60J 7/022; B60J 7/0015; B60J 7/0023; B60J 7/003; B60J 7/0038; B60J 1/2011
USPC ............ 296/216.04, 216.08, 216.07, 216.06
See application file for complete search history.

(56) References Cited

U.S. PATENT DOCUMENTS

| | | |
|---|---|---|
| 6,644,728 B1 | 11/2003 | Nagashima et al. |
| 6,817,658 B2 | 11/2004 | Ohnishi et al. |
| 8,419,119 B2 | 4/2013 | Nakamura et al. |
| 8,562,070 B2 | 10/2013 | Weyl et al. |
| 9,376,001 B2 | 6/2016 | Katsura |
| 2013/0015684 A1 | 1/2013 | Hattori et al. |
| 2016/0031300 A1 | 2/2016 | Katsura et al. |

FOREIGN PATENT DOCUMENTS

| | | |
|---|---|---|
| JP | 4279325 B2 | 6/2009 |
| JP | 2019-130946 A | 8/2019 |

*Primary Examiner* — D Glenn Dayoan
*Assistant Examiner* — Kevin P Weldon
(74) *Attorney, Agent, or Firm* — Oblon, McClelland, Maier & Neustadt, L.L.P.

(57) ABSTRACT

A sunshade structure is disclosed. The sunshade structure includes a sunshade; a guide rail; a sunshade stopper configured to stop a movement of the sunshade, the sunshade stopper including a first side wall and a second side wall; and an end cap configured to cap an end of the guide rail, the end cap including a bottom plate, a first sunshade stopper retention wall extending vertically from the bottom plate and configured to extend around the first side wall a second sunshade stopper retention wall extending vertically from the bottom plate and configured to extend around a junction of the first side wall and the second side wall a third sunshade stopper retention wall extending vertically from the bottom plate and configured to extend around the second side wall; and a fourth wall extending vertically from the bottom plate and configured to extend from an end of the second side wall to the end of the guide rail.

9 Claims, 5 Drawing Sheets

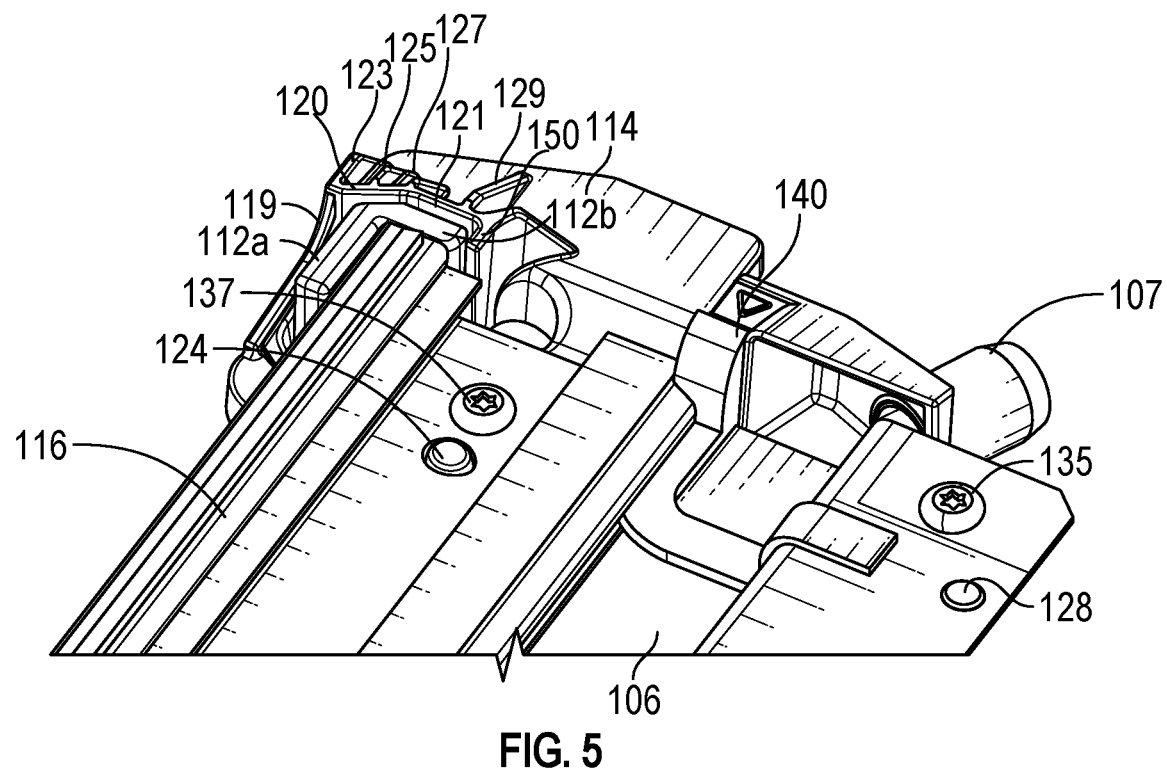
FIG. 5
FRONT OF A VEHICLE

END CAP ASSEMBLY

FIELD OF THE DISCLOSURE

This disclosure relates generally to vehicles and, more particularly, to an end cap structure adjacent to a sunshade stopper and a guide rail in the vehicle.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sunshade stopper rear retention wall in an end cap in a sunshade structure typically has a certain height to capture the sunshade stopper. However, when the sunshade stopper has deflection, the height of the sunshade stopper rear retention wall is not enough to prevent the deflection. Furthermore, there is no feature to prevent rotation of the sunshade stopper when the sunshade stopper has deflection. In order to provide a robust sunshade stopper, an improvement for the end cap is needed.

SUMMARY

A sunshade structure may include a sunshade; a guide rail; a sunshade stopper configured to stop a movement of the sunshade, the sunshade stopper including a first side wall and a second side wall; and an end cap configured to cap an end of the guide rail, the end cap including a bottom plate, a first sunshade stopper retention wall extending vertically from the bottom plate and configured to extend around the first side wall a second sunshade stopper retention wall extending vertically from the bottom plate and configured to extend around a junction of the first side wall and the second side wall a third sunshade stopper retention wall extending vertically from the bottom plate and configured to extend around the second side wall; and a fourth wall extending vertically from the bottom plate and configured to extend from an end of the second side wall to the end of the guide rail.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is another perspective view of an area in FIG. 1 including a sunshade stopper, and an end cap of a vehicle in accordance with the teachings of this disclosure.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1:
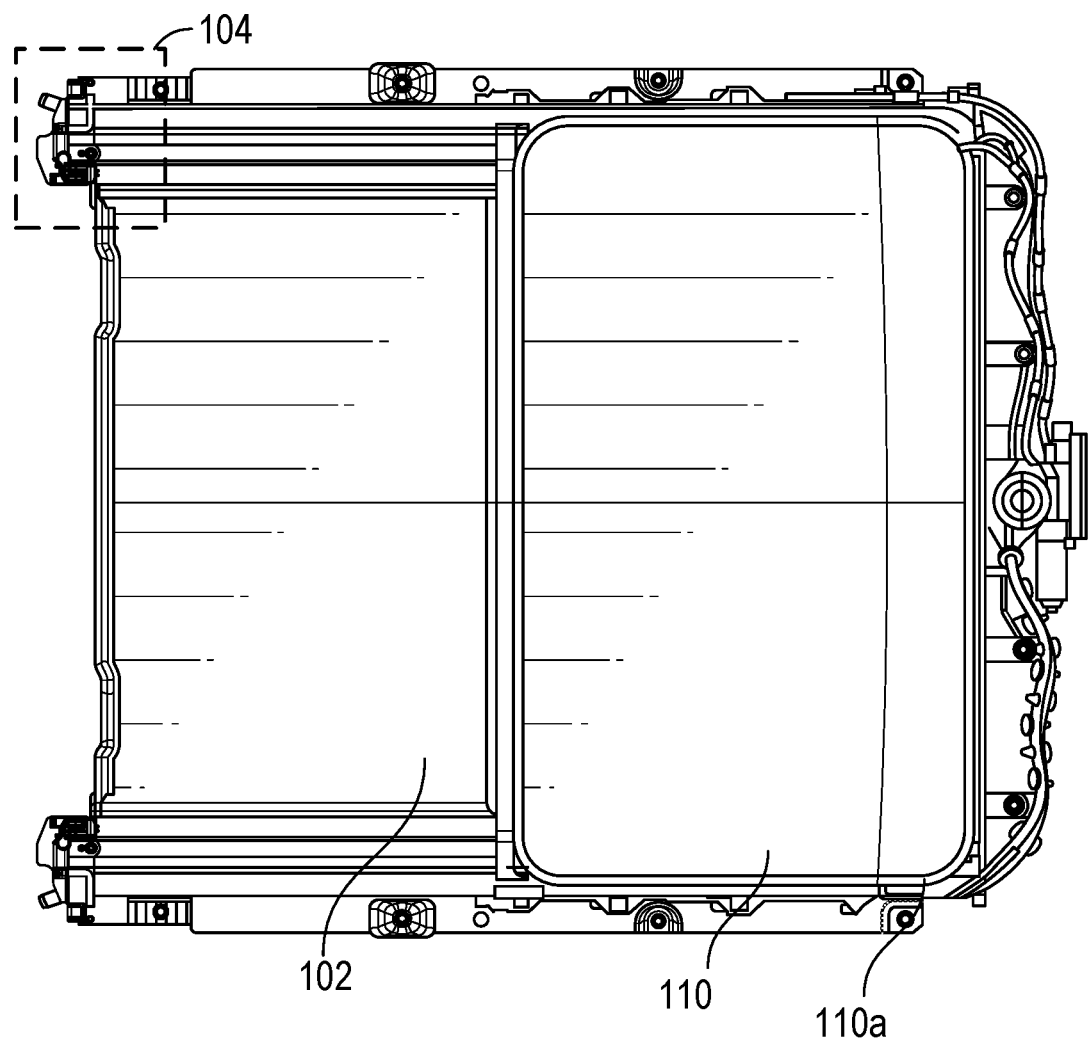
FIG. 1 is a perspective view of a sunshade of a vehicle in accordance with the teachings of this disclosure.

FIG. 1 is a perspective view of a sunshade 102 of a vehicle in accordance with the teachings of this disclosure. The front of the vehicle is on the right of FIG. 1. A sunroof assembly of the vehicle includes the sunshade 102 and a glass panel 110. The sunshade 102 may be made of fabric, or the like. The glass panel 110 may be a transparent panel made of transparent glass, resin, or other similar material, to take in sunlight. An outer periphery portion 110a of the glass panel 110 may be treated with a sealing member for a purpose of preventing rainwater to enter a vehicle compartment. The dashed line area 104 in FIG. 1 is an area including a sunshade stopper 112 and an end cap 114. The glass panel 110 may include one or more glass panels and the glass panel 110 may be above the sunshade 102 when the glass panel 110 slides in the front-rear direction of the vehicle.

Figure 2:
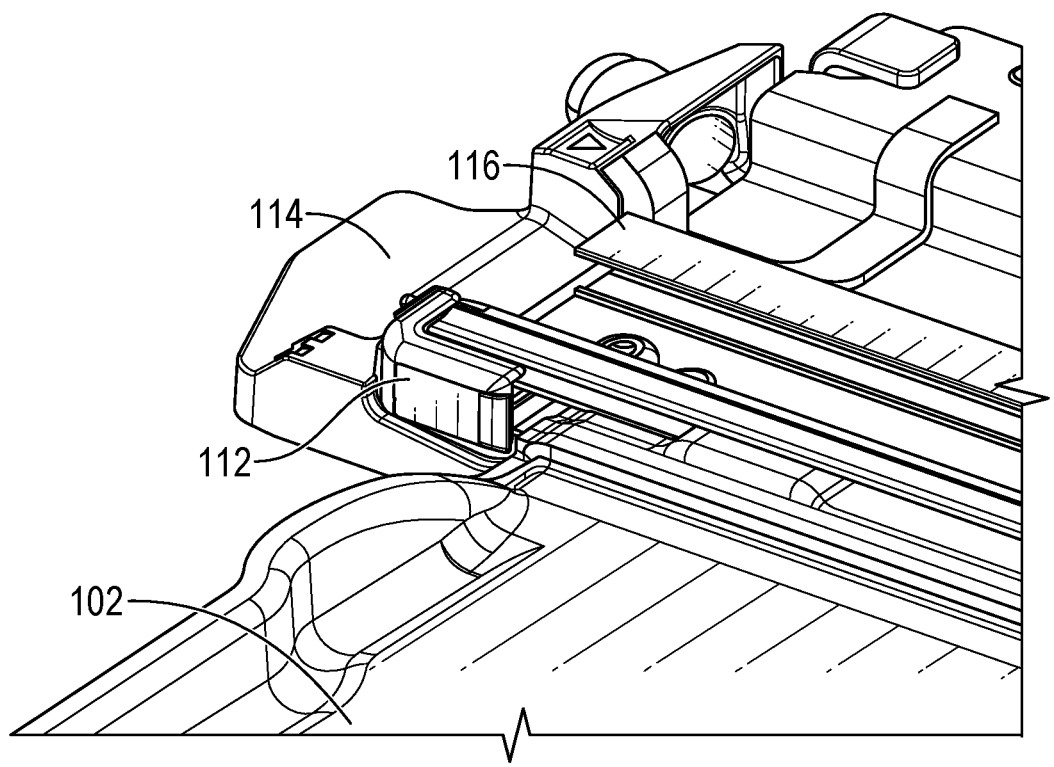
FIG. 2 is a perspective view of an area in FIG. 1 including a sunshade, a sunshade stopper, and an end cap of a vehicle in accordance with the teachings of this disclosure.

FIG. 2 is a perspective view of the dashed line area 104 including a sunshade 102, a sunshade stopper 112, and an end cap 114 in accordance with the teachings of this disclosure.

The end cap 114 may attach to the guide rail 116 and the sunshade stopper 112. The end cap 114 may be used to cap a rear end of the guide rail 116. The end cap 114 may extend around the sunshade stopper 112 and the guide rail 116. The sunshade 102 may be adjacent to the guide rail 116.

The sunshade 102 may slide on the guide rail 116 in the front-rear direction of the vehicle. The sunshade 102 being movable in the front-rear direction of the vehicle along the vehicle inner side of the guide rail 116. The drain 106 may be used to collect a flow of water, e.g., rain water, and the drain 106 may be sealed by the sealant to create a hydrophobic surface on the drain 106. The sealant used to seal the drain 106 may be, but not limited to rubber, wax, epoxy, silicone, acrylic, or the like.

Figure 3A:
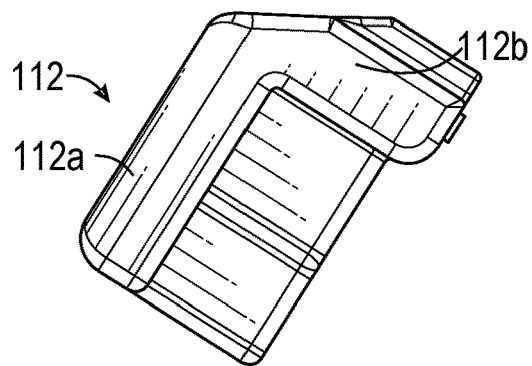
FIG. 3A is a top view of the sunshade stopper in accordance with the teachings of this disclosure.
Figure 3B:
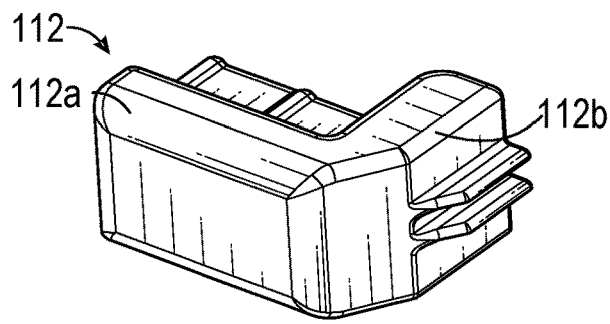
FIG. 3B is a bottom view of the sunshade stopper in accordance with the teachings of this disclosure.
Figure 3C:
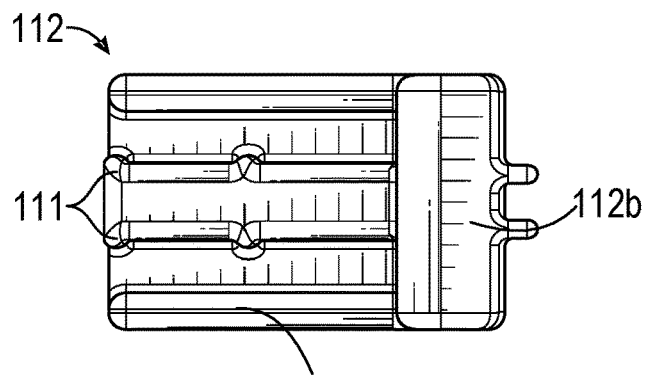
FIG. 3C is a side view of the sunshade stopper in accordance with the teachings of this disclosure.
Figure 3D:
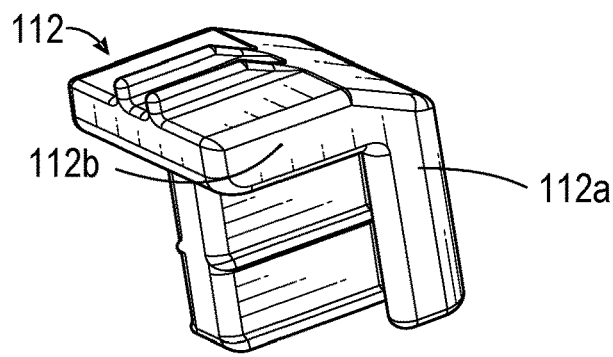
FIG. 3D is an isometric projection view of the sunshade stopper in accordance with the teachings of this disclosure.

FIG. 3A is a top view of the sunshade stopper 112 in accordance with the teachings of this disclosure. FIG. 3B is a bottom view of the sunshade stopper 112 in accordance with the teachings of this disclosure. FIG. 3C is a side view of the sunshade stopper 112 in accordance with the teachings of this disclosure. FIG. 3D is an isometric projection view of the sunshade stopper 112 in accordance with the teachings of this disclosure.

The sunshade stopper 112 may be L-shape as shown in FIGS. 3A, 3B, and 3D. In FIG. 3C, the pillars 111 of the sunshade stopper 112 may be inserted into the guide rail 116 as shown earlier in FIG. 2 and the pillars may be located under the guide rail 116. The materials of the sunshade stopper 112 may be rubber, plastic, or the like. The sunshade stopper 112 may be configured to stop the movement of the sunshade 102 in the front-rear direction by contacting an edge of the sunshade 102. The sunshade stopper 112 may be inserted into the end cap 114 as shown in FIG. 2. The sunshade stopper 112 may be located in between the end cap 114 and the guide rail 116. A side wall 112a of sunshade stopper 112 along the front-rear direction of the vehicle may be used to stop the movement of the sunshade 102. A side wall 112b of the sunshade stopper 112 along a lateral (left-right) direction of the vehicle may attach to an edge of the guide rail 116.

Figure 4A:
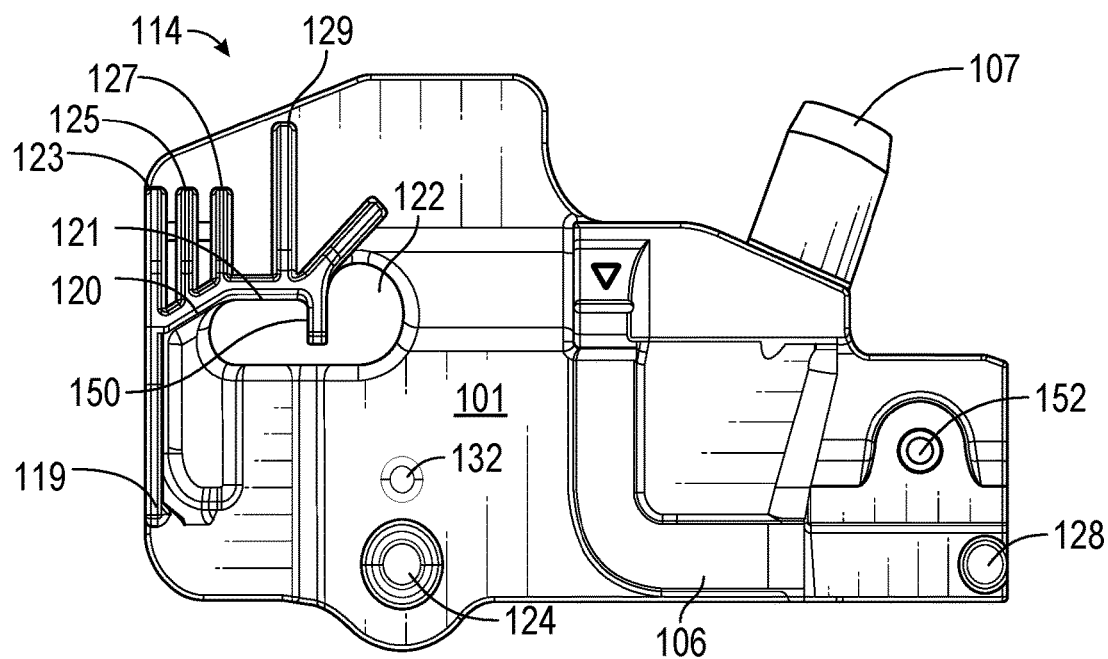
FIG. 4A is a top view of an end cap in accordance with the teachings of this disclosure.
Figure 4B:
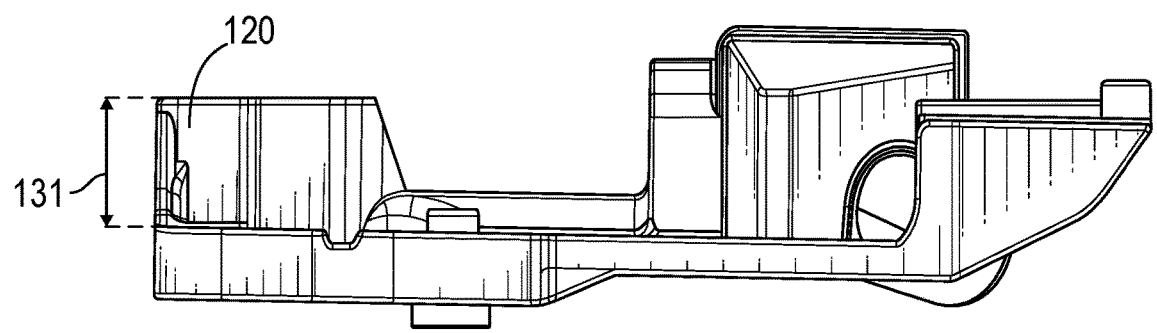
FIG. 4B is a front view of the end cap in accordance with the teachings of this disclosure.

FIG. 4A is a top view of an end cap 114 in accordance with the teachings of this disclosure. FIG. 4B is a front view of the end cap 114 in accordance with the teachings of this disclosure.

In an embodiment, the end cap 114 includes a bottom plate 101. Sunshade stopper retention walls 119, 120, 121 extend around an opening 122 in FIG. 4A. The sunshade stopper retention walls 119, 120, 121 may extend vertically from the bottom plate 101. The sunshade stopper retention side wall 150 may extend vertically from the bottom plate 101. The sunshade stopper retention wall 119 and the sunshade stopper retention side wall 150 extending substantially in the front-rear direction of the vehicle and parallel to the guide rail 116. The sunshade stopper retention walls 120 and 121 extending substantially in a lateral (left-right) direction of the vehicle and connecting the sunshade stopper retention wall 119 and the sunshade stopper retention side wall 150.

A wall height 131 of the sunshade stopper retention wall 120 may be between 9.6 mm and 10.2 mm as shown in FIG. 4B. The sunshade stopper retention wall 119 may be tapered from a top to a bottom in FIG. 4A. The height of the sunshade stopper retention wall 119 may be between 1.5 mm to 12.6 mm. A height of the sunshade stopper retention wall 121 may be between 9.6 mm and 10.2 mm. Protruding walls 123, 125, 127, and 129 may be located on the sunshade stopper retention wall 120 and 121. The length of protruding wall 123 may be between 14.4 mm and 15 mm. The length of protruding wall 125 may be between 12 mm and 12.6. The length of protruding wall 127 may be between 10.1 mm and 10.7 mm. The length of protruding wall 129 may be between 18.4 mm and 19 mm. Dowel 124 and dowel 128 may be used to attach the end cap 114 to a roof of a vehicle.

In an embodiment, a self tapping screw hole 132 may be located nearby the dowel 124, and the self tapping screw hole 132 may be used to attach the end cap 114 to the guide rail 116 as shown in FIG. 1B.

In an embodiment, a second self tapping screw hole 152 may be added. The purpose of adding the second self tapping screw hole 152 may be an easier installation and a reduced risk of damaging the seal during the installation. Furthermore, a stopper retention side wall 150 may be added in the middle of the opening 122, and the purpose of adding the stopper retention side wall 150 may prevent the sunshade stopper 112 from compressing and rotating around the edge of the guide rail 116. Therefore, the end cap 114 may be mounted to the guide rail 116 by using one or more screws into the self tapping screw hole 132 and the second self tapping screw hole on the end cap 114.

In an embodiment, water may flow into a drain 106 which is located in the middle of the end cap 114. The drain 106 may restrict the flow of water, e.g., rain water, or the like. The water may drain into the drain hole 107 and flow out of the end cap 114.

In an embodiment, in FIG. 4B, the wall height 131 of the sunshade stopper retention wall 120 may be between 9.6 mm and 10.2 mm. The wall height of the stopper retention side wall 150 may be between 9.6 mm and 10.2 mm.

In an embodiment, the wall height 131 of the sunshade stopper retention wall 120 may be high enough to prevent a deflection of the sunshade stopper 112 when the sunshade 102 is open, as shown in FIG. 1B.

In an embodiment, the adding of the stopper retention side wall 150 may prevent a rotation of the sunshade stopper 112, so the sunshade stopper 112 may stay retained when the sunshade 102 is open.

FIG. 5 is another perspective view of the area 104 in FIG. 1 including a sunshade stopper 112, an end cap 114, and guide rail 116 in accordance with the teachings of this disclosure.

In an embodiment, the end cap 114 attaches to the guide rail 116 and the sunshade stopper 112 after the end cap 114 is installed. The sunshade stopper retention walls 119, 120, and 121 extend around the sunshade stopper 112. The sunshade stopper retention wall 119 may be arranged in the front-rear direction of the vehicle and parallel to the guide rail 116. The sunshade stopper retention wall 120 may attach to a junction of a side wall 112a of the sunshade stopper 112 and a side wall 112b of the sunshade stopper 112. The sunshade stopper retention wall 121 may be arranged in the lateral (left-right) direction of the vehicle and attach to the sidewall 112b of the sunshade stopper 112. The side wall 112a may be perpendicular to the side wall 112b. The stopper retention side wall 150 attaches to the sunshade stopper 112. The stopper retention side wall 150 may provide an additional support for the sunshade stopper 112 from movement.

In an embodiment, the sunshade stopper retention wall 119 extends around a side wall 112a of the sunshade stopper 112. The side wall is in parallel to the direction of the guide rail 116. The sunshade stopper retention wall 120 may extend from an end of the side wall 112a to an end of the side wall 112b. The sunshade retention wall 121 may extend around the side wall 112b. The sunshade retention wall 150 may extend from another end of the side wall 112b to an end of the guide rail 116.

In an embodiment, the sunshade stopper retention wall 119 may be parallel to the side wall 112a of the sunshade stopper 112. The sunshade stopper retention wall 119 may be parallel to the sunshade stopper retention side wall 150. The sunshade stopper retention wall 121 may be perpendicular to the sunshade stopper retention side wall 150.

In an embodiment, a first height of an end of the sunshade retention wall 119 adjacent to an end of the side wall 112a is larger than a second height of another end of the sunshade retention wall 119 adjacent to another end of the side wall 112a. The first height is larger than the height 131 of the side wall 112a. The second height is smaller than the height 131 of the side wall 112a.

In an embodiment, a fourth height of the sunshade stopper retention wall 120 is larger than the height 131 of the side wall 112a. The fourth height of the sunshade stopper retention wall 120 is larger than a fifth height of the side wall 112b.

In an embodiment, a sixth height of the sunshade stopper retention wall 121 is larger than the fifth height of the side wall 112b. A seventh height of the sunshade stopper retention wall 150 is larger than the fifth height of the side wall 112b.

In an embodiment, the protruding walls 123, 125, 127, and 129 attach to the sunshade stopper retention walls 120 and 121 and to the bottom plate 101.

In an embodiment, an angle between the sunshade stopper retention wall 119 and the sunshade stopper retention wall 120 is between 119 degrees and 121 degrees. An angle between the sunshade stopper retention wall 120 and the sunshade stopper retention wall 121 is between 149 degrees and 151 degrees. The sunshade stopper retention wall 121 is perpendicular to sunshade stopper retention side wall 150. The sunshade stopper retention wall 119 is parallel to the sunshade stopper retention side wall 150.

In an embodiment, a first self-tapping screw 137 may be located on the guide rail 116. A second self-tapping screw 135 may be located on the other side of the guide rail 116. Dowel 128 and dowel 124 may be located nearby the self-tapping screws 135 and 137, respectively. A seal 140 for the drain 106 may also be shown in FIG. 5. The purpose of the seal 140 may prevent water intrusion into the vehicle. The material of the seal may be a polyurethane synthetic sponge.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A sunshade structure, comprising:
    a sunshade;
    a guide rail;
    a sunshade stopper configured to stop a movement of the sunshade, the sunshade stopper including a first side wall and a second side wall; and
    an end cap configured to cap an end of the guide rail, the end cap including
        a bottom plate,
        a first sunshade stopper retention wall extending vertically from the bottom plate and configured to extend around the first side wall
        a second sunshade stopper retention wall extending vertically from the bottom plate and configured to extend around a junction of the first side wall and the second side wall;
        a third sunshade stopper retention wall extending vertically from the bottom plate and configured to extend around the second side wall; and
        a fourth wall extending vertically from the bottom plate and configured to extend from an end of the second side wall to the end of the guide rail.

2. The sunshade structure of claim 1, wherein the sunshade stopper is located in between the guide rail and the end cap.

3. The sunshade structure of claim 1, wherein an angle between the first sunshade stopper retention wall and the second sunshade stopper retention wall is between 119 degrees and 121 degrees.

4. The sunshade structure of claim 1, wherein an angle between the second sunshade stopper retention wall and the third sunshade stopper retention wall is between 149 degrees and 151 degrees.

5. The sunshade structure of claim 1, wherein one or more protruding walls attach to the second sunshade stopper retention wall, the third sunshade stopper retention wall, and the bottom plate.

6. The sunshade structure of claim 1, wherein the first sunshade stopper retention wall (119) is substantially parallel to the fourth wall.

7. The sunshade structure of claim 1, wherein the first sunshade stopper retention wall is substantially parallel to the first side wall.

8. The sunshade structure of claim 1, wherein the third sunshade stopper retention wall (121) is substantially perpendicular to the fourth wall.

9. The sunshade structure of claim 1, wherein the first side wall is substantially perpendicular to the second side wall.

* * * * *